May 31, 1949. W. S. MARTIN 2,471,882
MEANS FOR CONVERTING MATERIAL
Filed May 7, 1946 2 Sheets-Sheet 1

INVENTOR.
WARREN S. MARTIN
BY Louis L. Ansart
his Attorney

May 31, 1949.  W. S. MARTIN  2,471,882
MEANS FOR CONVERTING MATERIAL
Filed May 7, 1946  2 Sheets-Sheet 2
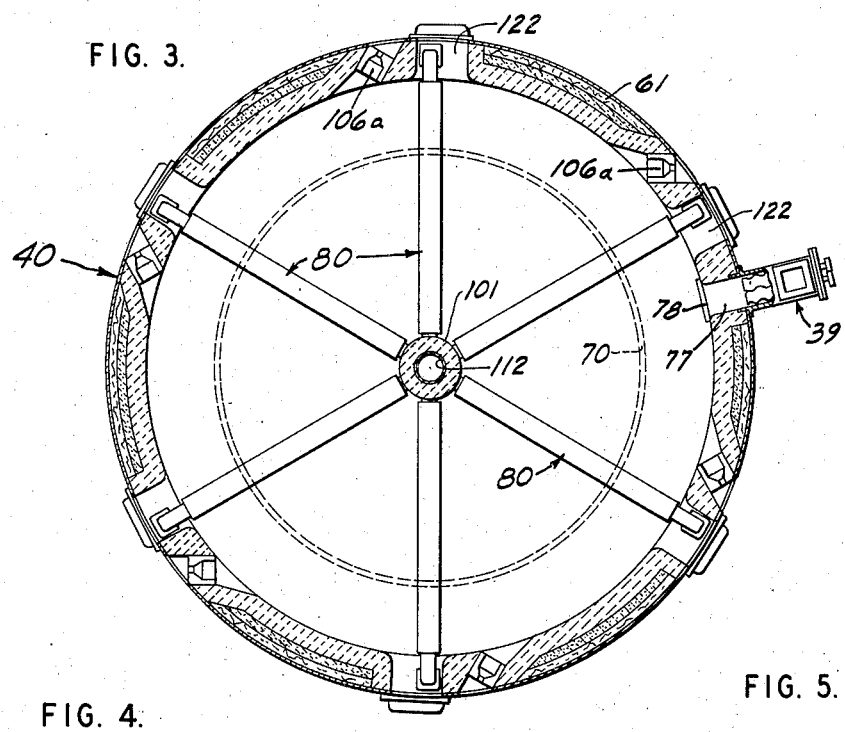
FIG. 3.
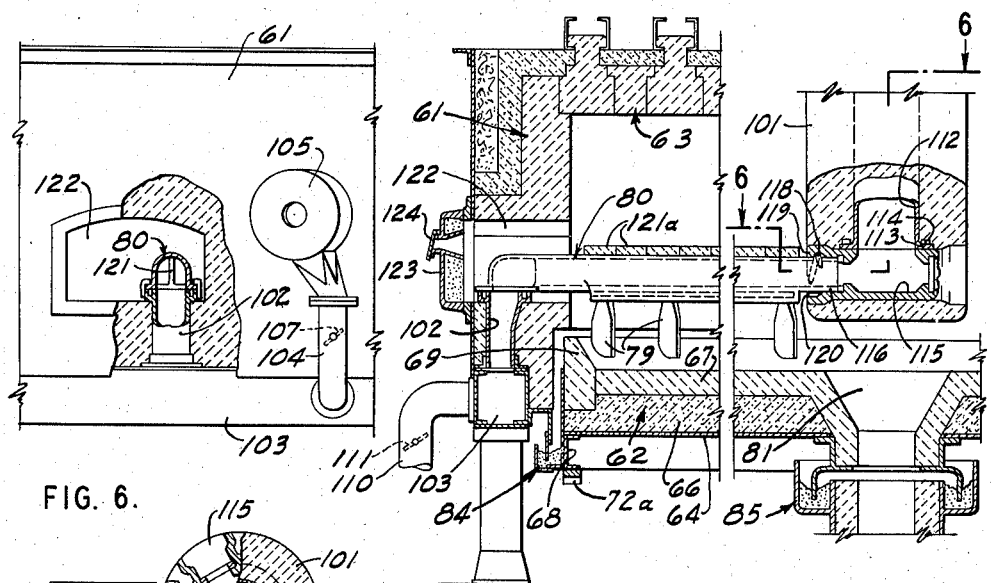
FIG. 4.
FIG. 5.
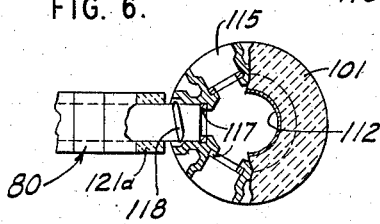
FIG. 6.
INVENTOR.
WARREN S. MARTIN
BY Louis L. Ansart
his Attorney Patented May 31, 1949

2,471,882

UNITED STATES PATENT OFFICE 2,471,882

MEANS FOR CONVERTING MATERIAL

Warren S. Martin, Massapequa, N. Y.

Application May 7, 1946, Serial No. 667,872

11 Claims. (Cl. 263—26)

The present invention relates to apparatus for converting material. More specifically, it relates for example, to the conversion into CaO, of $CaCO_3$ in finely divided or powdered form. The $CaCO_3$ to be treated may be residue, commonly known as lime mud, of the lime soda process of water softening, of paper pulp preparation, of refining sugar and of other processes. The lime mud to be treated has a high moisture content, which may be as high as 90% moisture.

This invention is in the nature of an improvement on the invention disclosed and claimed in my co-pending application, Serial No. 591,824, filed May 3, 1945.

An important object is to provide a novel and advantageous apparatus for carrying out methods of the general character specified.

Another object of the invention is to provide a novel and advantageous means for carrying out the invention without production of an excessive amount of lime dust.

Another object of the invention is to provide an apparatus adapted to eliminate dust, such as lime dust, so as to avoid the loss of such a valuable product as quick lime, for example, and to avoid damage to vegetation, etc., caused by extensive discharge of quick lime to the atmosphere.

Another object is to provide apparatus of the general character specified which is durable under high temperature conditions.

Another object of the invention is to provide apparatus of the character specified which is able to resist and prevent the production of slag caused by certain impurities in connection, for example, with re-calcination.

Yet another object is to provide apparatus especially adapted for the recovery of lime from calcining sludges such as those precipitated from certain water softening plants, paper pulp plants, beet sugar manufacturing plants, etc.

A further object of the invention is to provide apparatus wherein a minimum amount of dust will be stirred up and put into suspension in the air and gases in the apparatus. The fineness of the dust renders it almost impossible to reclaim the fines from suspension.

One form of calcining apparatus embodying the present invention comprises a vertical multiple hearth dryer and preheater discharging the dried and preheated material from the bottom thereof into a pulverizer which in turn discharges into a calcining unit. There may be a plurality of calcining units and a corresponding number of pulverizers. The material on each calcining hearth is completely calcined in connection with continuous stirring or agitation, under uniform heating by direct firing. The heated exhaust gases of each calcining hearth pass to the bottom of the multiple hearth dryer and preheater and flow countercurrently to the movement of material under treatment, to obtain the optimum heat transfer. These gases pass off into the atmosphere at a temperature in the neighborhood of 350° F. Each calcining unit comprises a rotating hearth on which the dried and preheated material is deposited near its circumference and is fed inwardly to the center by means including stationary rabble arms with rabble teeth suitably inclined.

Other objects, features and advantages will appear upon consideration of the following detailed description and of the drawings in which Figure 1 is a vertical section through the axis of the dryer and preheater and the axis of a calcining unit;

Figure 3 is a section taken along the line 3—3 of Figure 1;

Figure 4 is a fragmentary view of a calcining unit as seen from the outside showing the air supply means for a burner and also a work door, parts being broken away to show underlying structure;

Figure 5 is a fragmentary sectional view, partially broken away to shorten the same, showing an air supply duct of a calcining unit with its connection to a stationary rabble arm, and other associated structures; and Figure 6 is a section taken along the line 6—6 of Figure 5.

Figures 1, 2:
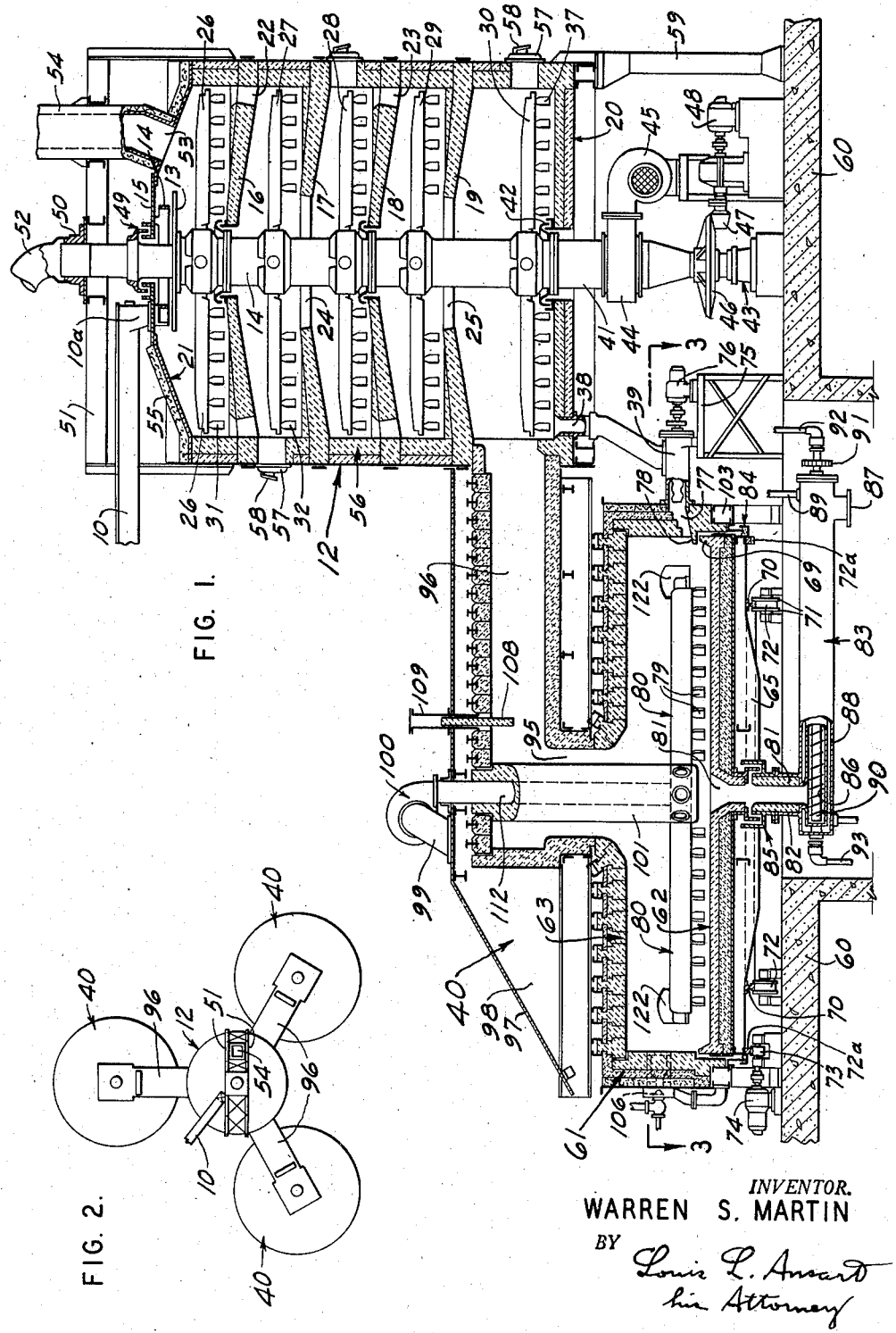
Figure 2 is a top plan view of a preheater connected to three calcining units.

Referring to the drawings and particularly to Figure 1, material to be treated is fed through a conveyor 10 and a chute 10a to an opening in a plate 11 in the top of a multiple hearth furnace 12 serving as a dryer and preheater. The lower end of this chute delivers the material through said opening to the outer edge of a circular disk 13 on a center shaft 14 of the dryer and preheater to rotate therewith. Above the disk 13 is a spiral blade 15 which as the center shaft rotates in a clockwise direction as seen from above, gradually feeds the material over the outer edge of the disk or circular plate so that it drops in an annular area on the uppermost hearth 16 as illustrated. Obviously the distributing means may be varied in many ways. The circular plate and spiral blade feeder just described is described and claimed in my Patent No. 2,361,557, October 31, 1944.

The dryer and preheater 12 has four hearths 16, 17, 18 and 19 and a bottom 20 as well as a top 21. The hearths 16 and 18 have discharge or drop openings 22 and 23 respectively at their peripheries and the hearths 17 and 19 have center openings 24 and 25 respectively. Above the hearths 16, 17, 18 and 19 and the bottom 20 are rabble arms 26, 27, 28, 29 and 30 respectively. Projecting downwardly from the arms 26 are plows or rabble teeth 31 so inclined as to gradually work material dropped on the central portion of hearth 16 to its periphery, where the material will drop through openings 22 and fall upon the peripheral part of hearth 17. The rabble arms 27 are provided with rabble plows or teeth 32 which feed the material inwardly from its periphery and cause it to fall through the central opening 24 to the central part of hearth 18. In the same manner the material is fed outwardly on hearth 18 and falls through opening 23 and inwardly on the hearth 19 to fall through the opening 25.

The material falling from the opening 25 on the bottom 20 is gradually worked out to the periphery of said bottom 20 by plows or blades 37 and eventually passes downwardly through a bottom duct 38 into a pulverizer and feeder 39 from which it passes into a calcining unit 40. In the event that more than one calcining unit is provided there will be a discharge duct 38 for each additional unit 40 corresponding to the duct 38.

From two to four arms are provided over each hearth and, if additional agitation on the hearth is desired, certain rabble teeth corresponding thereto may be arranged to give back rabbling. The depth of material bed as well as the extent of agitation on any one hearth may be regulated as desired.

The center shaft 14 which is in general similar to that disclosed and claimed in my Patent No. 2,332,387, October 19, 1943, is of the air-cooled sectional type providing air cooling of each of the rabble arms as well as the shaft itself. The lowermost section 41 of the shaft which extends through said furnace bottom 20 and a suitable seal 42, in the furnace bottom 20, is fitted with a bottom bearing 43 and a wind box receiver 44 to supply to the shaft 14 air forced into said wind box by a fan 45. Said lowermost section is also provided with a bevel gear 46 driven by means including a bevel gear 47 which in turn is driven by a motor 48.

At the top of the dryer, the center shaft 14 passes through a seal 49 for the gap between the interior surface of the opening and the outer surface of the shaft. Above the seal 49 the shaft is mounted in a bearing 50 which is supported by cross beams 51 carried by the dryer structure.

The cooling air for the shaft and rabble arms is heated during its passage therethrough and eventually passes out of the top of the shaft into a duct 52. The air thus preheated may be used in connection with a fuel burning system for example in connection with supplying auxiliary heat to the dryer. Gases and vapors reaching the top of the drier may be discharged through an opening 53 in the top 21 of the dryer and a duct 54 extending upwardly from said top 21 and supported by said beams 51. Said opening 53 is in an annular plate 55 supported at its outer edge on the peripheral wall of the dryer and supporting at its inner edge the plate 15.

The multiple hearth drier and preheater 12 is cylindrical in shape and the superimposed hearths already described may be constructed of special firebrick shapes forming conical or dome arches supported by a cylindrical side wall 56. The side wall is constructed of firebrick and insulation encased in a steel shell with an additional steel band at each arch to resist the radial load. A work door 57 and an inspection door 58 are provided for each hearth. If required, the dryer and preheater may be equipped with burners (not shown) which may be supplied with preheated air from the duct 52. The dryer 12 may be supported by means including legs 59 resting on a concrete foundation 60 which supports the general apparatus.

In the calcining unit 40 illustrated in Figure 1, a peripheral cylindrical wall 61 of firebrick and insulation is supported on said concrete base 60 and is partially closed at its bottom by a rotatable hearth 62, and at its top by a flat arch roof 63 which may be supported by steel and cast hangers in a manner similar to that used for large boiler installations.

The hearth consists of a steel bottom or pan 64 provided with a reinforcing frame 65. The steel pan 64 is lined with insulation 66 and paved with firebrick 67 including a downwardly extending annular flange 68 in a corresponding depression in the insulation 66. The firebrick paving also includes an upwardly projecting flange or rim 69 having an upwardly and outwardly flared inner surface to guide matter deposited thereon, inwardly and away from the edge of the hearth to prevent spilling thereover. The wall 61 is recessed so as to provide a part to overhang the top of the flange and reduce the leakage of fine material.

At its bottom, the frame 65 is provided with an inverted track formed of an inverted rail 70 resting in the grooves between flanges 71 at the peripheries of pulleys or roller 72 supported on the concrete frame 60. The hearth is also provided at its bottom and near its periphery with a downwardly facing gear 72. The hearth is rotated at a slow speed by suitable means including a gear 73 meshing with gear 72 and driven by a motor 74 acting through suitable speed reducing means.

The pulverizer 39 is mounted on a table 75 on which are also mounted a motor 76 and suitable speed reducing means through which the pulverizer is mounted. The material in the pulverizer is fed into a downwardly inclined passage or chute 77 in the wall 61. From this passage 77, the pulverized material passes to the rotatable hearth 62 over an inwardly projecting lip 78.

During rotation of the hearth 61, the pulverized material thereon will be fed inwardly in generally spiral paths by suitably inclined ploughs or teeth 79 on stationary rabble arms 80. Eventually the material will reach the central part of the rotatable hearth 63 and pass downwardly through a central discharge port 81 into a short duct 82 discharging into a water cooled conveyor 83. There is a sand seal 84 around the perimeter of the rotating hearth, a sand seal 85 at the outlet port 81, and at the pulverizer a seal is provided by the material itself.

The conveyor 83 comprises an inner casing 86 through which the calcined material, which may be at a temperature of about 1950° F., passes from the duct 81 to an outlet 87, and an outer casing 88 providing a water jacket receiving cooling water through a pipe 89 near the discharge end of the conveyor and discharging the water at a higher temperature near the inlet end of the conveyor. The material is fed through the casing 86 by a hollow rotary member 90 therein driven by means of a gear 91 thereon. Water from a pipe 92 is supplied to said hollow rotary member 90 at the material-discharge end of the conveyor and is discharged therefrom through a pipe 93. It should be understood that the hot material such as lime might be carried away by a screw conveyor without such cooling of the material.

The hot exhaust gases from the central part of the calcining unit 40 pass upwardly through a central opening 95 and then through a single brick lined flue 96 insulated for high temperature to the lowermost compartment of dryer 12, above the lowermost hearth or bottom 20. Over the flue 96 and the top of calcining unit 40, there is a metal cover 97 spaced therefrom and partially enclosing an air chamber 98 from which air may be drawn through a duct 99 to a fan or blower 100. From the blower 100, the air passes downwardly through a hollow center support 101 for the hollow stationary rabble arms 80.

The passage at the interior of center support 101 communicates with the interior of each rabble arm and supplies cooling air which flows to the outer ends of said rabble arms, where each rabble arm has a downwardly facing outlet which registers with the interior of a downwardly extending duct 102 which serves to support the outer end of this rabble arm. Each duct 102 passes downwardly through the wall 61 and connects with a manifold 103 in the form of a ring, extending around the base of the wall 61. From said manifold 103, the air heated by its passage through hollow rabble arms 80 is fed through ducts 104 to air supply boxes 105 having central openings through which project fuel nozzles 106 (Fig. 1) which occupy wall openings 106a at a substantial inclination to the radii. If a nozzle 106 is not in use, the corresponding air duct 104 is closed by means of a damper 107.

When one or more calcining units 40 are used, it may be desired to cut out or take out of use one of said calcining units temporarily. In that event, the flue or duct 96 might be closed by lowering a damper 108 slidably mounted in a guide 109. It would then be desirable to discharge into the open air, some of the air supplied to the duct or manifold 103 being released through a duct 110 controlled by a damper 111.

Various specific features associated with the rabble arms 80 will now be discussed. The center support 101 includes a vertical inner tube 112 of metal provided at its lower end with a flange 113 which is secured by means such as screws 114 to a spider 115 having a plurality of sockets 116 to receive the inner ends of said rabbling arms 80.

At the inner end of each socket 116 is a seat supporting a washer 117 which is engaged by the inner end of a rabble arm 80. Each rabble arm has near said inner end a short rib 118 arranged like part of a screw thread and adapted to engage the inner inclined face of a part 119 at the upper side of the socket, the lower part of the socket having a recess 120 which admits said rib 118 when the arm, its outer end being raised, is turned in one direction so that when the arm is turned in the opposite direction about its axis the rib 118 will wedge back of part 119 and lock the inner end of the arm in its socket, the outer end being then lowered upon the upper end of the corresponding duct 102, and held against movement with respect thereto by suitable means.

Each arm 80 is preferably formed with a central vertical partition 121 which is kept cool by the flow of air on both sides. This arrangement acts to prevent sagging of the arms. The rabble arms are formed so as to avoid accumulation thereof of slag and have insulation 121a at their tops and sides. The rabble teeth 79 are of heat resisting material and of such design to avoid accumulation of slag.

The outer ends of the rabble arms are located in work openings 122 in the wall 61, these openings being closed normally by work doors 123 which are provided with inspection doors 124.

It should be noted that each door 123 is provided at its inner face with a thick layer of insulating material.

A brief review will now be had of the operation of the apparatus and the manner in which the calcining method is carried out. The multiple hearth furnace 12 is used to dry lime mud or lime cake and preheat calcium carbonate ($CaCO_3$) to some temperature of say 1400° to 1600° F. before discharge for calcining treatment. The lime cake is charged into the dryer at the top of the unit near its center, and for optimum efficiency the feed is carried on in a continuous manner.

Any combustible impurities contained originally in the lime cake, will burn out during this operation. Small soft pellets of $CaCO_3$ are usually formed, and this action is advantageous in decreasing the possibility of creating dust during the preheating. This hot material is discharged from the bottom 20 of the dryer into a pulverizer 39 to provide for a more uniform burn in the calcining unit 40, and eliminating any need for pulverizing and additional handling at the end of calcining operation.

The pulverized $CaCO_3$ is fed from the pulverizer 39 through the passage 77 in the peripheral wall of calcining unit, and deposited on the rotating hearth near its circumference or periphery. Feeding in a continuous manner tends to provide perfect distribution, thus avoiding the probability of puddling and of dead areas.

The rabbling equipment in the calcining furnace may consist of six rabble arms 80. Three equally spaced arms 80 carrying suitable inclined rabble teeth which plough the bed and advance the material a step toward the center of the rotating hearth 60, while the other three arms have the inclination of the rabble teeth reversed to produce back rabbling. The back-rabbling teeth plow the bed in the reverse direction but to less than a full step.

This arrangement of alternate rabbling and back rabbling provides maximum agitation of the bed while retaining the material for sufficient calcination treatment. The detention time required depends somewhat on the temperature maintained in the furnace. For ordinary operation, the calcining treatment should be complete in from 60 to 70 minutes, the time required for travel from the inlet or point of feed to the outlet, while the furnace temperatures are maintained at from 2000° to 2200° F.

Lime discharged from the calcining unit at temperatures of from 1950° to 2000° F. up to 2200° F. may be conveyed to a desired point near the circumference of the furnace foundation by a suitable conveyor which may be uncooled or water-cooled.

The fineness of precipitate lime varies in particle size from 200 to 3000 mesh sieve depending upon the process involved. The mere handling of such material involves dust to some extent and in the general design of this drying and calcining apparatus every precaution has been taken to avoid high velocities of gas flow at points in the apparatus. With the burner nozzles 106 located at the circumference of unit 40 and well above the material bed, there is very little tendency to raise dust. The gases of production flow through the flue 96 into the lowermost compartment of the dryer. This is a part where raising of dust might be expected but here the material is in pellet form and is not easily turned to dust.

It should be understood that various changes may be made and that certain features may be made without others, without departing from the true scope and spirit of the invention.

What I claim is:

1. A calcining furnace comprising a peripheral wall, a rotary hearth having a central discharge port, a low flat roof having a central gas outlet, burners directed inwardly through said wall, stationary radial rabbling arms with longitudinal passages and rabble teeth projecting downwardly therefrom to feed material to said central discharge port, means for introducing material through said wall to the outer part of said hearth, a central device for supporting the inner ends of said arms and supplying air to the interior thereof, and means at said wall to support the outer ends of said arms and to supply the air therefrom to the burners.

2. The combination according to claim 1 wherein the rabble arms are readily connected and detached.

3. The combination according to claim 1 wherein the outer end of each rabble arm has a downwardly facing outlet which rests on the top of a duct which receives air therefrom and the inner end is round with a fragment of a screw thread thereon and said central device is provided with sockets, each having a round inner end to receive the tip of a corresponding arm and a wider portion at the mouth provided with an internal screw thread fragment whereby the tip of an arm may be inserted into a socket and then locked in the socket by a partial turn of the arm.

4. The combination of a dryer comprising a plurality of superimposed hearths serving as the bottoms of compartments of said dryer and provided alternately from the bottom to the top with drop openings at their peripheries and centers, rabbling means for feeding material to said drop openings, and a peripheral wall having a gas inlet therethrough into the lowermost compartment; a calcining furnace having a single rotary hearth provided with a central material-outlet, a low flat top with a central gas outlet, a peripheral wall having a material inlet above said rotary hearth, burners directed inwardly through said wall, stationary air-cooled rabbling devices above said rotary hearth and arranged to feed material from said material inlet to said material outlet; means for feeding material from the lowermost hearth of said dryer through said material inlet in the side wall of said calcining furnace; and means for passing gases from the central gas outlet in the top of said calcining furnace through said gas inlet in the peripheral wall of said dryer and into the lowermost compartment of said dryer.

5. The combination according to claim 4 wherein said means for feeding material from the lowermost hearth of the dryer into the material inlet in the peripheral wall of said calcining furnace comprises a pulverizer which serves as a gas seal.

6. The combination according to claim 4 wherein said central gas outlet in the roof of said calcining furnace is connected by a horizontally extending flue to said gas inlet of said lowermost compartment of said dryer and said gas inlet is spaced above the hearth at the bottom of said compartment.

7. The combination according to claim 4 wherein said central gas outlet in the roof of said calcining furnace is connected by a horizontally extending flue to said gas inlet in the side of the lowermost compartment of the dryer and there is an insulated air-inlet duct extending downwardly through the top of said flue and the central part of said gas outlet and connected to the inner ends of said rabble arms to supply air thereto and to support the inner ends thereof.

8. The combination according to claim 4 wherein said central gas outlet in the roof of said calcining furnace is connected by a horizontally extending flue to said gas inlet in the lowermost compartment of said dryer, an insulated air-inlet duct extends downwardly through the top of said flue and the central part of said gas outlet and is connected to the inner ends of said rabble arms to supply air thereto, a cover over said flue extending to said dryer, and flow producing means supplies air from space beneath said cover into the upper end of said duct.

9. The combination according to claim 1 wherein a fluid-cooled conveyer receives the calcined material from the central discharge port in said rotary hearth.

10. The combination of a dryer through which the material passes downwardly and out through an outlet in the bottom thereof and hot gases pass inwardly through a side inlet and upwardly therethrough, with a calcining furnace comprising a peripheral wall with an inlet through which dried material from said dryer passes, a rotary hearth having a central discharge outlet and arranged to receive at its periphery dried material from said inlet, a roof having a central gas outlet connected to the inlet of said dryer, burners projecting through said peripheral wall, an air supply duct extending downwardly through said gas outlet, hollow radial rabble arms detachably connected at their inner ends to said air duct and having downwardly-facing outlets at their outer ends, means for supplying heated air from said rabble arms to said burners, comprising ducts projecting upwardly through the bottom of doorways closed by outside doors and adapted to support the outer ends of said rabble arms and connect the interiors of said arms with said burners, and rabble blades on said rabble arms to feed material on said rotatable hearth to said central discharge outlet.

11. A high temperature furnace comprising a peripheral wall, a rotary hearth having a central discharge, a low flat roof having a gas outlet, burners directed inwardly through said wall, stationary radial rabbling arms with longitudinal passages and rabble teeth projecting downwardly therefrom to feed material to said central discharge, means for introducing material to the peripheral part of said hearth, a device for supporting the inner ends of said arms, means for supplying cooling fluid to the interior of said arms, and means at said wall to support the outer ends of said arms.

WARREN S. MARTIN.

(References on following page)

REFERENCES CITED

The following references are of record in the file of this patent:

UNITED STATES PATENTS

| Number | Name | Date |
|---|---|---|
| 159,384 | Brewster | Feb. 2, 1875 |
| 740,589 | Repath et al. | Oct. 6, 1903 |
| 785,437 | Repath et al. | Mar. 21, 1905 |
| 915,531 | Von Zelewski | Mar. 16, 1909 |
| 1,499,850 | Bonnard | July 1, 1924 |
| 1,605,279 | Pike | Nov. 2, 1926 |
| 1,674,919 | Pike | June 26, 1928 |
| 1,706,748 | Rigby | Mar. 26, 1929 |

OTHER REFERENCES

Page 276 of Trinks' "Industrial Furnaces," vol. II, second edition, published by John Wiley and Sons, New York, New York.